(12) United States Patent
Fukunaga et al.

(10) Patent No.: US 12,605,757 B2
(45) Date of Patent: Apr. 21, 2026

(54) MANUFACTURING METHOD OF BATTERY CASE

(71) Applicant: DAIWA CAN COMPANY, Chiyoda-ku (JP)

(72) Inventors: Minoru Fukunaga, Sagamihara (JP); Kazuhiro Saeki, Sagamihara (JP)

(73) Assignee: DAIWA CAN COMPANY, Chiyoda-ku (JP)

( * ) Notice: Subject to any disclaimer, the term of this patent is extended or adjusted under 35 U.S.C. 154(b) by 648 days.

(21) Appl. No.: 17/907,382

(22) PCT Filed: Feb. 2, 2021

(86) PCT No.: PCT/JP2021/003686
§ 371 (c)(1),
(2) Date: Sep. 26, 2022

(87) PCT Pub. No.: WO2021/192622
PCT Pub. Date: Sep. 30, 2021

(65) Prior Publication Data
US 2023/0124823 A1 Apr. 20, 2023

(30) Foreign Application Priority Data
Mar. 27, 2020 (JP) ................................. 2020-058721

(51) Int. Cl.
*B21D 51/16* (2006.01)
*H01M 50/103* (2021.01)

(52) U.S. Cl.
CPC .......... *B21D 51/16* (2013.01); *H01M 50/103* (2021.01)

(58) Field of Classification Search
CPC .. H01M 50/103; H01M 50/10; H01M 50/133; B21D 51/16; Y02E 60/10
(Continued)

(56) References Cited

U.S. PATENT DOCUMENTS

| | | | |
|---|---|---|---|
| 5,722,282 A | 3/1998 | Mine et al. | |
| 6,258,480 B1 | 7/2001 | Moriwaki et al. | |

(Continued)

FOREIGN PATENT DOCUMENTS

| | | | |
|---|---|---|---|
| JP | 8-141662 A | 6/1996 | |
| JP | 11-144690 A | 5/1999 | |

(Continued)

OTHER PUBLICATIONS

English Translation of JP 2018051575 A (Year: 2018).*
International Search Report issued Apr. 13, 2021 in PCT/JP2021/003686 filed on Feb. 2, 2021, 2 pages.

*Primary Examiner* — Osei K Amponsah
*Assistant Examiner* — Kevin Nguyen
(74) *Attorney, Agent, or Firm* — Oblon, McClelland, Maier & Neustadt, L.L.P.

(57) ABSTRACT

A manufacturing method of a battery case having a rectangular transverse cross-section in which an intermediate product having an elliptical transverse cross-section is shaped into a final product having a rectangular transverse cross-section by drawing and ironing the intermediate product multiple times to reduce a curvature radius of each corner and thicknesses of side walls formed on both sides of the corner. A difference between an ironing rate of the side wall formed on one side of the corner and an ironing rate of the side wall formed on the other side of the corner is reduced less than a predetermined difference, after the curvature radius of the corner between the side walls has been reduced shorter than a predetermined radius during the process of shaping the intermediate product into the final product.

3 Claims, 5 Drawing Sheets

(58) Field of Classification Search
USPC ........................................................ 29/623.1
See application file for complete search history.

(56) References Cited

U.S. PATENT DOCUMENTS

| | | | |
|---|---|---|---|
| 6,929,880 B1 | 8/2005 | Mori et al. | |
| 2003/0003355 A1* | 1/2003 | Ueda .................. | H01M 50/133 |
| | | | 429/185 |
| 2009/0068557 A1* | 3/2009 | Sakashita ............... | B21D 51/16 |
| | | | 72/370.14 |
| 2012/0091150 A1 | 4/2012 | Kanazawa et al. | |
| 2018/0099325 A1* | 4/2018 | Nakamura ............. | B21D 22/28 |

FOREIGN PATENT DOCUMENTS

| | | | |
|---|---|---|---|
| JP | 2007-260740 | A | 10/2007 |
| JP | 4119612 | B2 | 7/2008 |
| JP | 2009-113059 | A | 5/2009 |
| JP | 2011-25935 | A | 2/2011 |
| JP | 2013-128986 | A | 7/2013 |
| JP | 2013-196777 | A | 9/2013 |
| JP | 2014-203706 | A | 10/2014 |
| JP | 2014-231064 | A | 12/2014 |
| JP | 2014-233755 | A | 12/2014 |
| JP | 2015-197964 | A | 11/2015 |
| JP | 5975573 | B2 | 8/2016 |
| JP | 6160185 | B2 | 7/2017 |
| JP | 2018-51575 | A | 4/2018 |
| JP | 2019-166527 | A | 10/2019 |

* cited by examiner

MANUFACTURING METHOD OF BATTERY CASE

TECHNICAL FIELD

The present invention relates to a manufacturing method of a battery case for holding components of a battery including a positive plate, a negative plate, a separator, an electrolyte and so on, and more specifically, to a manufacturing method of a battery case comprising a case body having a rectangular transverse cross-section and a sealing plate closing an opening of the case body.

BACKGROUND ART

In the prior art, there is known a high-capacity secondary battery (i.e., an assembled battery) in which a plurality of lithium-ion cell stacks are connected to one another to be modularized. For example, such assembled battery may be employed in an electric vehicle to serve as an electric storage device. In order to fit the assembled battery easily into the electric vehicle, each cell of the cell stack is shaped into a rectangular or square shape.

A case of the cell stack is formed by attaching a sealing plate to an opening of an open box-shaped case body by a laser welding method. The case body is formed by drawing and ironing a metallic plate into a bottomed-cylindrical intermediate product having an elliptical cross-section, and further drawing and ironing the intermediate product into an open box-shape having a rectangular transverse cross-section while reducing a thickness of each side wall to a desired thickness.

Japanese Patent No. 4119612 disclose a method of manufacturing a product having a rectangular transverse cross-section by a drawing and ironing processing method (DI processing) in which both of drawing and ironing are executed by one stroke of a punch. Japanese Patent No. 4119612 describes that a requirement for shaping an intermediate cup element having an elliptic cross-section into a battery case having a rectangular cross-section without cracking or wrinkling is to form the battery case in such a manner as to form a plate on the shorter side thicker than a plate on the longer side.

In order to shape an intermediate product having an elliptic cross-section into a final product having a rectangular transverse cross-section without wrinkling, it is preferable to reduce a clearance between a punch and the intermediate product. For example, according to the forming method described in Japanese Patent No. 5975573, a sleeve is fitted onto a punch having a profile congruent with a shape of the final produce so as to reduce the clearance between the punch and the intermediate product remaining in the initial phase of drawing of the intermediate product. By thus fitting the sleeve onto the punch, buckling and wrinkling at a portion which cannot be supported by the punch can be prevented in the initial phase of drawing of the intermediate product.

Further, according to the manufacturing method described in Japanese Patent Laid-Open No. 2019-166527, a blank having an elliptical outline is shaped into an open box-shaped first intermediate product having a rectangular transverse cross-section. Then, the first intermediate product is shaped into a second intermediate product by drawing a corner between side walls and a bottom wall into a substantially rectangular, and ironing the side walls. Thereafter, the second intermediate product is shaped into a final product by ironing the side wall.

SUMMARY OF INVENTION

Technical Problem to be Solved by the Invention

In general, after forming the final product having a rectangular transverse cross-section, a stepped portion on which a sealing plate is mounted along an inner surface of an opening end of the case body is formed by pushing the inner surface of the opening end of the case body from inside thereby reducing a thickness of the opening end. To this end, it is preferable to form a side wall of the case body to have an extra thickness to form the stepped portion. For example, a wall thickness of the shorter side wall may be ensured to form the stepped portion by forming the case body by the method taught by Japanese Patent No. 4119612. However, the stepped portion has to be formed also on the longer side wall of the case body. If the case body is formed by the method taught by Japanese Patent No. 4119612, not only the longer side walls but also the short side walls will be thickened. Consequently, a capacity of the case body would be reduced. Otherwise, a size of the case body would be increased to ensure a desired capacity. Thus, it is required to develop a manufacturing method of the case body possible to set a wall thickness of each side wall individually.

As described, according to the forming method described in Japanese Patent No. 5975573, the sleeve is inserted between an outer surface of the punch and an inner surface of the intermediate product to prevent buckling at the portion which cannot be supported by the punch in the beginning of the drawing. However, according to the teachings of Japanese Patent No. 5975573, although the sleeve is interposed between the punch and the intermediate product in the initial phase of the drawing, a load to push the outer surface of the intermediate product onto a surface of the die is not applied to the intermediate product. Therefore, the intermediate product having an elliptical cross-section may not be drawn sufficiently, and the intermediate product as to be drawn several times to be shaped into the final product having a rectangular transverse cross-section. In addition, in order to reduce a curvature radius of the corner of the intermediate product, another sleeve is to be employed at a subsequent step. However, since a thickness of another sleeve is thin, it would be difficult to insert another sleeve between the punch and the intermediate product. Therefore, it is required to develop a manufacturing method possible to draw and iron the intermediate product without using the sleeve.

As also described, according to the manufacturing method described in Japanese Patent Laid-Open No. 2019-166527, the side wall of the second intermediate product having a rectangular transverse cross-section is ironed. However, if a curvature radius between the side walls is short and the side walls are ironed at different rates, one of the side walls would be wrinkled due to a plastic flow of the other one of the side walls. That is, the shorter side walls and the longer side walls may not be formed to have different thicknesses by the manufacturing method described in Japanese Patent Laid-Open No. 2019-166527.

The present invention has been conceived noting the above-explained technical problems, and it is therefore an object of the present invention to provide a manufacturing method of a battery case having a rectangular transverse cross-section without restriction e.g., on a thickness of a side wall.

Means for Solving the Problem

According to the present invention, there is provided a manufacturing method of a battery case having an open box-shaped case body and a sealing plate closing an opening of the case body. In order to achieve the above-explained objective, according to the present invention, the manufacturing method comprises: forming a bottomed intermediate product having an elliptical or oval transverse cross-section by drawing and ironing a blank prepared in advance; and shaping the intermediate product into the case body as a final product having a rectangular transverse cross-section by drawing and ironing the intermediate product multiple times to reduce a curvature radius of each corner and thicknesses of side walls formed on both sides of the corner. Specifically a difference between an ironing rate of the side wall formed on one side of the corner and an ironing rate of the side wall formed on the other side of the corner is reduced to a predetermined difference or less, after the curvature radius of the corner between the side walls has been reduced shorter than a predetermined radius during the process of shaping the intermediate product into the final product.

According to the present invention, the side walls formed on both sides of the corner may be ironed at predetermined rates set individually to reduce thicknesses of the side wall formed on the one side of the corner and the side wall formed on the other side of the corner to target thicknesses, in a situation where the curvature radius of the corner between the side walls is equal to the predetermined radius or longer.

According to the present invention, the side wall formed on the one side of the corner and the side wall formed on the other side of the corner maybe ironed such that a difference between heights of the side walls is reduced to a predetermined value or less, in a situation where the curvature radius of the corner between the side walls is equal to the predetermined radius or longer.

According to the present invention, the predetermined value may be set such that the side wall formed on the one side of the corner and the side wall formed on the other side of the corner are expanded in same amounts or rates when being ironed after the curvature radius of the corner between the side walls is reduced shorter than the predetermined radius.

According to the present invention, the predetermined difference may be 1% or less.

According to the present invention, the predetermined radius may be 2 mm or shorter.

Advantageous Effects of Invention

Thus, according to the present invention, the final product having a rectangular transverse cross-section is formed by drawing and ironing the intermediate product having an elliptical or oval transverse cross-section multiple times to reduce a curvature radius of each corner and thicknesses of side walls formed on both sides of the corner. After the curvature radius of the corner between the side walls has been reduced shorter than the predetermined radius during the process of shaping the intermediate product into the final product, the difference between an ironing rate of the side wall formed on one side of the corner and an ironing rate of the side wall formed on the other side of the corner is reduced to the predetermined difference or less. Therefore, even if the corner may not serve as a transitional section sufficiently after the curvature radius of the corner has been reduced, the side wall ironed at a smaller rate will not be wrinkled by a plastic flow of the material from the side wall ironed at the greater rate.

In addition, according to the present invention, the side walls formed on both sides of the corner are ironed at predetermined rates set individually to reduce thicknesses of the side wall formed on one side of the corner and the side wall formed on the other side of the corner to target thicknesses, in a situation where the curvature radius of the corner between the side walls is the predetermined radius or longer and hence the corner may serve sufficiently as the transitional section. That is, in the situation where the curvature radius of the corner between the side walls is the predetermined radius or longer, the target thicknesses and ironing rates of the side walls, or a difference between thicknesses of the side walls may be adjusted in advance. Therefore, the final product may be shaped while achieving required thicknesses and height of the side walls by ironing the side walls at similar rates after the curvature radius of the corner has been reduced, even if the required thicknesses and height of the side walls are different.

In addition, in the situation where the curvature radius of the corner is still equal to the predetermined radius or longer, the side walls are ironed such that a difference between height of the side walls is reduced less than the predetermined value. Therefore, an easiness of plastic flow of the material in the height direction of the intermediate product can be homogenized when ironing the side walls after the curvature radius of the corner has been reduced shorter than the predetermined radius. For this reason, an easiness of plastic flow of the material in the circumferential direction of the intermediate product will not be changed by a difference in easiness of plastic flow of the material in the height direction of the intermediate product between the side walls. Consequently, the side walls can be prevented from being wrinkled by the ironing process.

DESCRIPTION OF EMBODIMENT(S)

Figure 1:
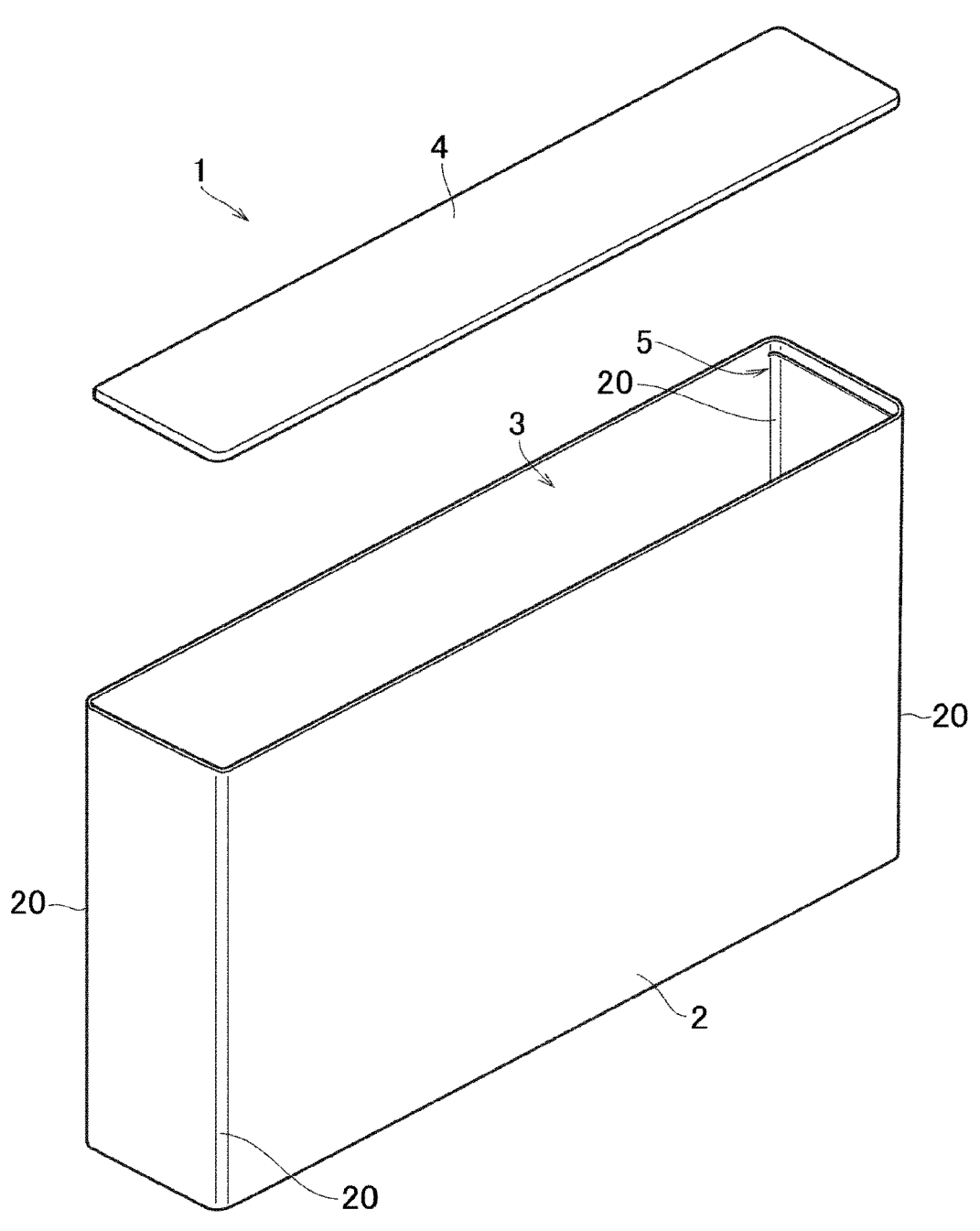
FIG. 1 is a perspective view showing one example of a battery case to which the present invention is applied.

Turning now to FIG. 1, there is shown are example of a battery case 1 according to the present invention. The battery case 1 shown in FIG. 1 comprises an open box-shaped case body 2 having a rectangular transverse cross-section, and a rectangular sealing plate 4 closing an opening 3 of the case body 2 liquid-tightly. For example, components of a battery such as a positive plate, a negative plate, a separator, an electrolyte etc. are held in the battery case 1. The sealing plate 4 is fitted into the opening 3 of the case body 2 and welded to an inner circumference of the case body 2 by a laser beam. To this end, according to the example shown in FIG. 1, a stepped portion 5 on which the sealing plate 4 is placed is formed along an inner surface of each shorter side wall of the case body 2. After forming the case body 2, the stepped portion 5 is formed by pushing the inner surface of the shorter side wall of the opening 3 from inside thereby reducing a thickness of the shorter side wall of the opening 3 thinner than that of the remaining portion expanding toward a bottom. For example, the case body 2 and the sealing plate 4 are formed of aluminum alloy of 1050 series or 3000 series defined by JIS H 4140.

In order to form the case body 2, an elliptic or oval blank is cut out of a coil material, and is drawn and ironed to be shaped into an intermediate product having an elliptical or oval transverse cross-section. The intermediate product is subjected to a drawing and an ironing multiple times thereby shaping the transverse cross-section gradually into a desired rectangular shape and reducing a wall thickness gradually to a desired thickness. After drawing and ironing the intermediate product, an upper end of the intermediate product is trimmed to adjust a height of the intermediate product to a desired height. Here will be explained procedures of cutting the elliptical blank out of the coil material, and shaping the blank into the intermediate product having an elliptical transverse cross-section by the drawing and the ironing processes.

Figure 2:
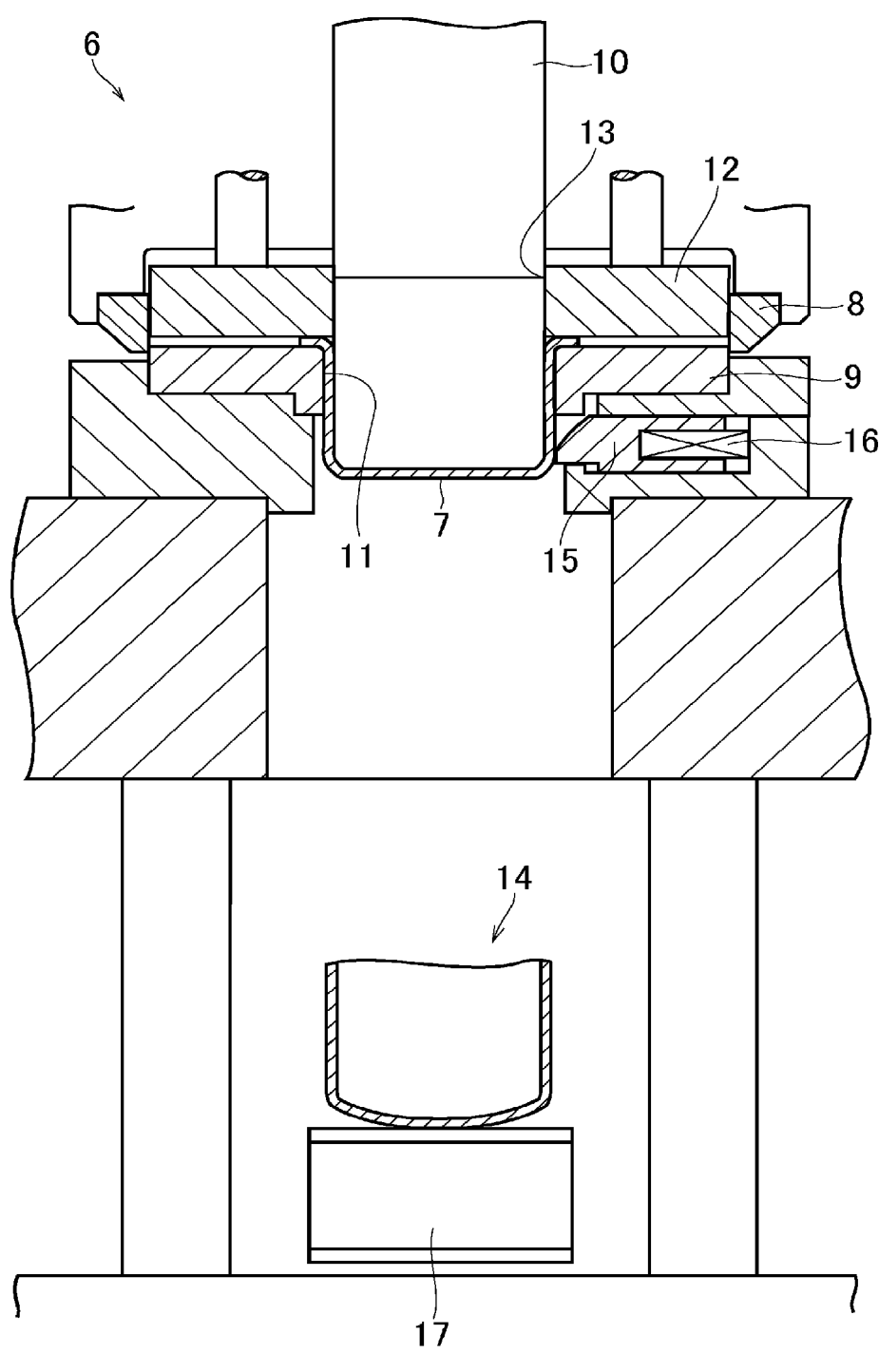
FIG. 2 is a cross-sectional view showing a cross-section of a press machine for forming an intermediate product from a coil material.

Turning to FIG. 2, there is schematically shown one example of a press machine 6 for cutting an elliptical blank out of a coil material, and shaping the blank into the intermediate product having an elliptical transverse cross-section by drawing the blank. The press machine 6 shown in FIG. 2 comprises a die cutter 8 that cuts a blank 7 out of the coil material, and a punch cutter 9. The die cutter 8 has an elliptical inner profile which is substantially congruent with an outer profile of the blank 7 to be cut out. The punch cutter 9 is situated below the die cutter 8 to apply a shearing force to the coil material with the die cutter 8. Therefore, the coil material is sheared between the die cutter 8 and the punch cutter 9 by moving the die cutter 8 downwardly. To this end, an outer profile of the punch cutter 9 is substantially congruent with the inner profile of the die cutter 8.

A through hole 11 is formed in the punch cutter 9 to insert an after-mentioned punch 10. In order to prevent wrinkling of the blank 7 during the drawing process, a plate-shaped holding member 12 is arranged in a radially inner side of the die cutter 8 to hold the blank 7 between the holding member 12 and the punch cutter 9. The holding member 12 is allowed to reciprocate in a pressing direction relatively to the die cutter 8. Specifically, when the die cutter 8 is positioned at a top dead point, a lower surface of the holding member 12 is situated below a lower surface of the die cutter 8. In addition, a through hole 13 is formed in the holding member 12 to insert the punch 10. Thus, an upper surface of the punch cutter 9 and the lower surface of the holding member 12 are opposed to each other. The coil material is held between the holding member 12 and the punch cutter 9 by moving the die cutter 8 and the holding member 12 downwardly, and thereafter sheared by further moving the die cutter 8 downwardly. After shearing the coil material, the blank 7 cut out of the coil material may be held between the upper surface of the punch utter 9 and the lower surface of the holding member 12.

The punch 10 descends into the punch cutter 9 situated radially inner side of the die cutter 8 from above thereby ironing the blank 7 cut out of the coil material. In order to form an intermediate product 14, the punch 10 has an elliptical outer profile. Whereas, the punch cutter 9 serves as a die during the drawing process of the blank 7, and to this end, the through hole 11 of the punch cutter 9 has a profile to form the intermediate product 14 into a desired shape.

In order to dismount the intermediate product 14 remaining on the punch 10 after the drawing process, a stripper finger 15 is arranged underneath the punch cutter 9 while being allowed to reciprocate in the horizontal direction with respect to the punch 10. In the example shown in FIG. 2, a compression spring 16 is arranged in an opposite side of the punch 10 across the stripper finger 15 so as to push the stripper finger 15 onto the punch 10. In addition, a lower edge of the stripper finger 15 in the punch 10 sided takes the form of an arcuate angle. Therefore, when the punch 10 is moved downwardly, a load is applied to the stripper finger 15 in a direction to compress the compression spring 16. Consequently, the stripper finger 15 is withdrawn from the punch 10 and the blank 7 being subjected to the drawing. Eventually, after the blank 7 descends lower than the stripper finger 15, a leading end of the stripper finger 15 comes into contact to an outer surface of the punch 10.

The press machine 6 is a double action press machine adapted to execute a shearing process of cutting the blank 7 out of the coil material and a drawing process of deforming the blank 7 at one stroke. Specifically, first of all, the coil material is fed between the die cutter 8 and the punch cutter 9. In this situation, a die cutter assembly including the die cutter 8 and the holding member 12 is moved downwardly to hold the coil material between the punch cutter 9 and the holding member 12. Thereafter, the die cutter 8 is further moved downwardly to cut the blank 7 out of the coil material by the die cutter 8 and the punch cutter 9. The blank 7 thus cu out of the coil material is held between the punch cutter 9 and the holding member 12, and the punch 10 is moved downwardly. In this situation, a clamping force established by the punch cutter 9 and the holding member 12 is set to a magnitude possible to prevent wrinkling of the blank 7 during the drawing process.

As a result of thus moving the punch 10 downwardly, the blank 7 is drawn into the intermediate product 14 having an elliptical transverse cross-section. Thereafter, the punch 10 is moved downwardly to a predetermined level, and moved upwardly to a waiting level (i.e., an initial level). While the punch 10 is being moved upwardly; the upper end of the intermediate product 14 fitted tightly onto the punch 10 comes into contact to the stripper finger 15 so that the intermediate product 14 is dismounted from the punch 10. Thus, the punch 10 is moved down temporarily to the level at which the upper end of the intermediate product is situated lower than the stripper finger 15. The intermediate product 14 dismounted from the punch 10 is conveyed by a conveyer 17 running underneath the press machine 6 to a next stage of the process.

Figure 3:
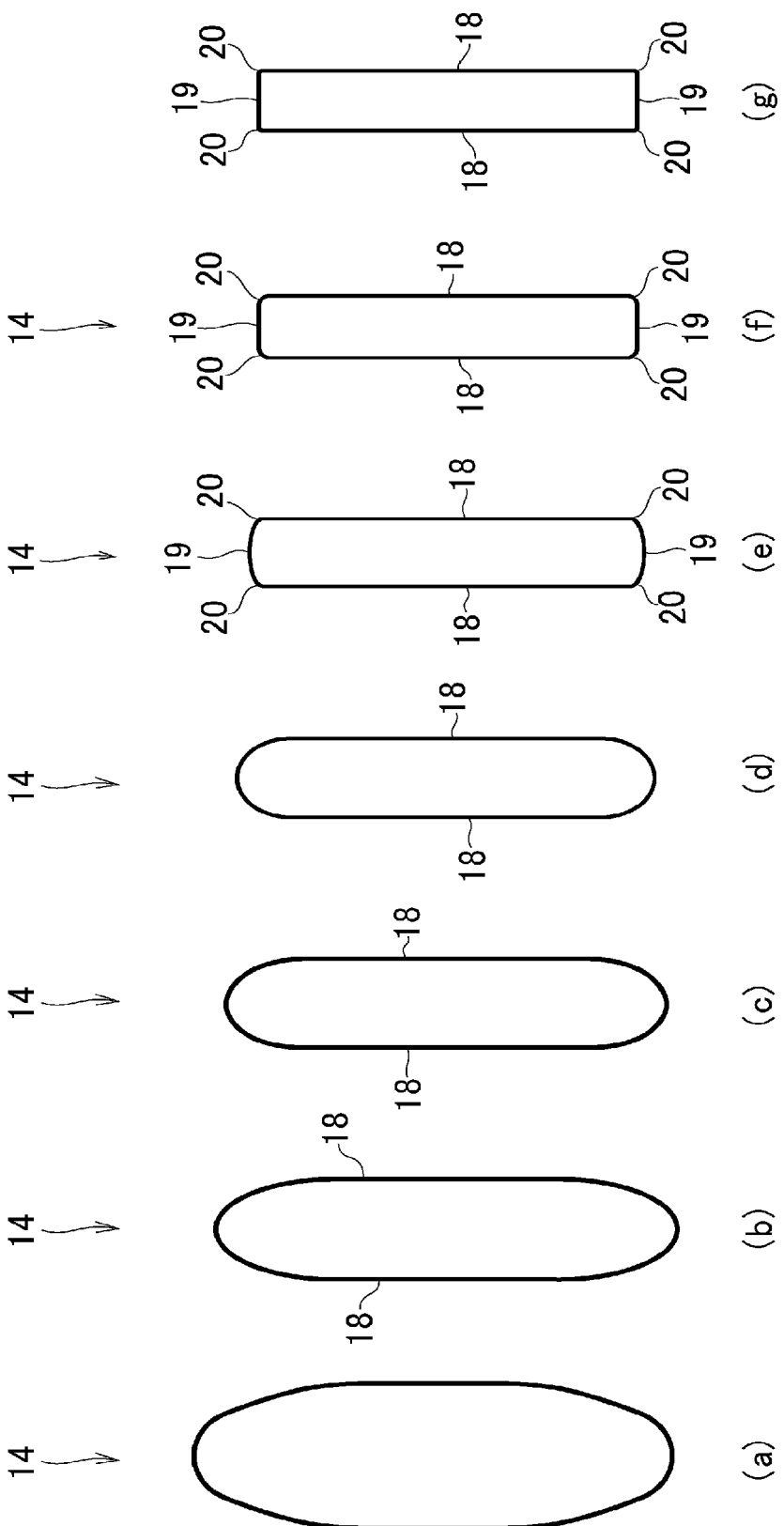
FIG. 3 is a top view showing the intermediate product being shaped into the final product.
Figure 4:
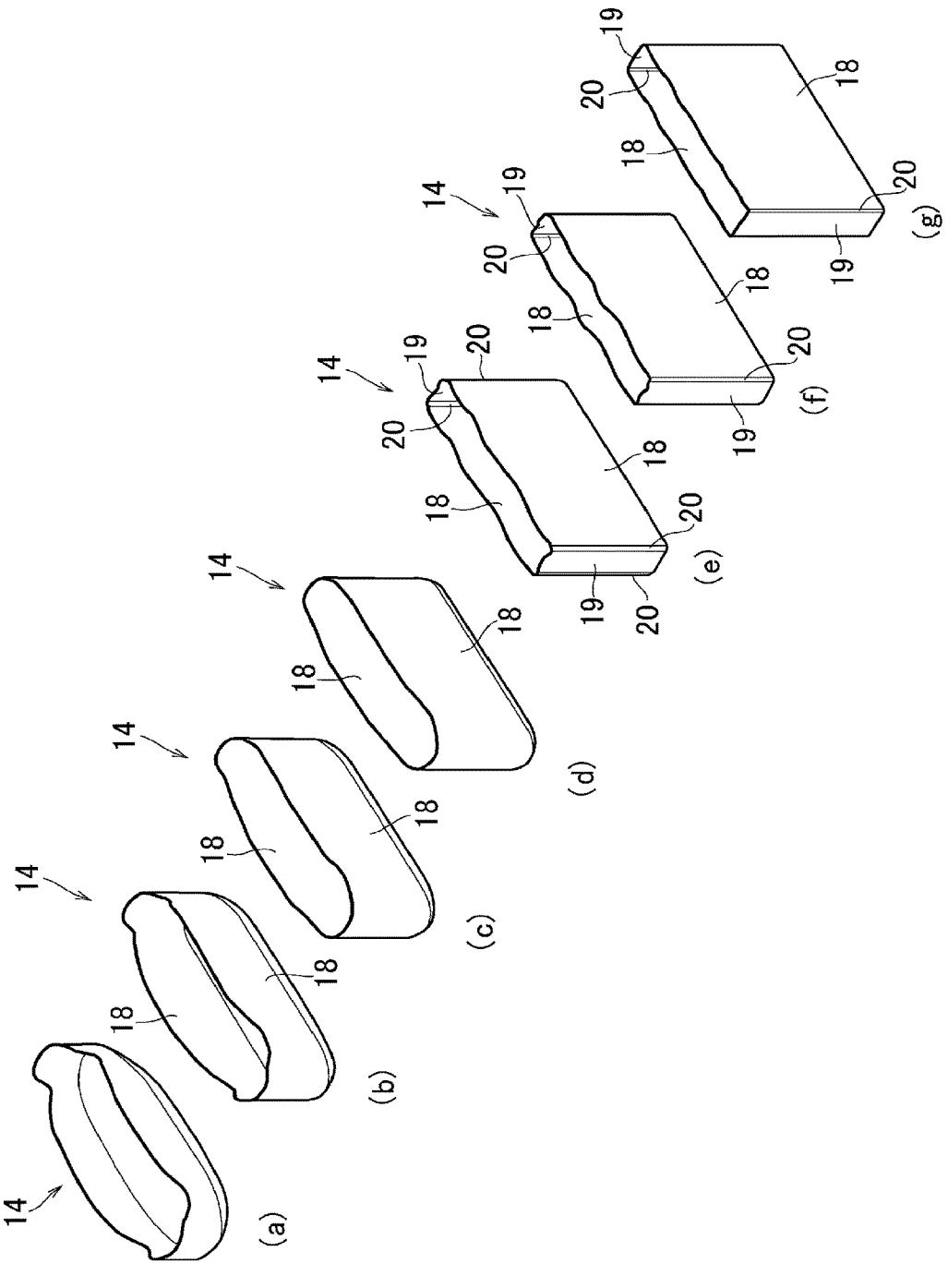
FIG. 4 is a perspective view showing the inter mediate product being shaped into the final product.

A top view of the intermediate product 14 thus manufactured is shown in FIG. 3 (a), and a perspective view of the intermediate product 14 is shown in FIG. 4 (a). The intermediate product 14 is deformed by a transfer press machine that can perform multiple steps at one stroke. Consequently, an outer shape of the intermediate product 14 is changed sequentially by the drawing process as illustrated in FIGS. 3 (b) to 3 (g), and FIGS. 4 (b) to 4 (g), and the side walls of the intermediate product 14 are thinned and drawn upwardly by the ironing process. As a result, the intermediate product 14 is shaped into the final product as illustrated in FIGS. 3 (g) and 4 (g).

Specifically, at the first step, each of the longer side walls of the intermediate product 14 is shaped into a straight section 18 as illustrated in FIGS. 3 (b) and 4 (b). At the second and third steps, as illustrated in FIGS. 3 (c), 3 (d), 4

(c), and 4 (d), the straight sections 18 are drawn and a clearance between the straight sections 18 is reduced. At the fourth step, as illustrated in FIGS. 3 (e) and 4 (e), each of the shorter sides of the intermediate product 14 is shaped into a straight section 19. At the fifth and sixth steps, as illustrated in FIGS. 3 (f), 3 (g), 4 (f), and 4 (g), a curvature radius of each corner 20 between the straight sections 18 and 19 is reduced gradually. Here, in the initial phase during the first and second steps, only the drawing process may be applied to the intermediate product 14 without executing the ironing.

Figure 5:
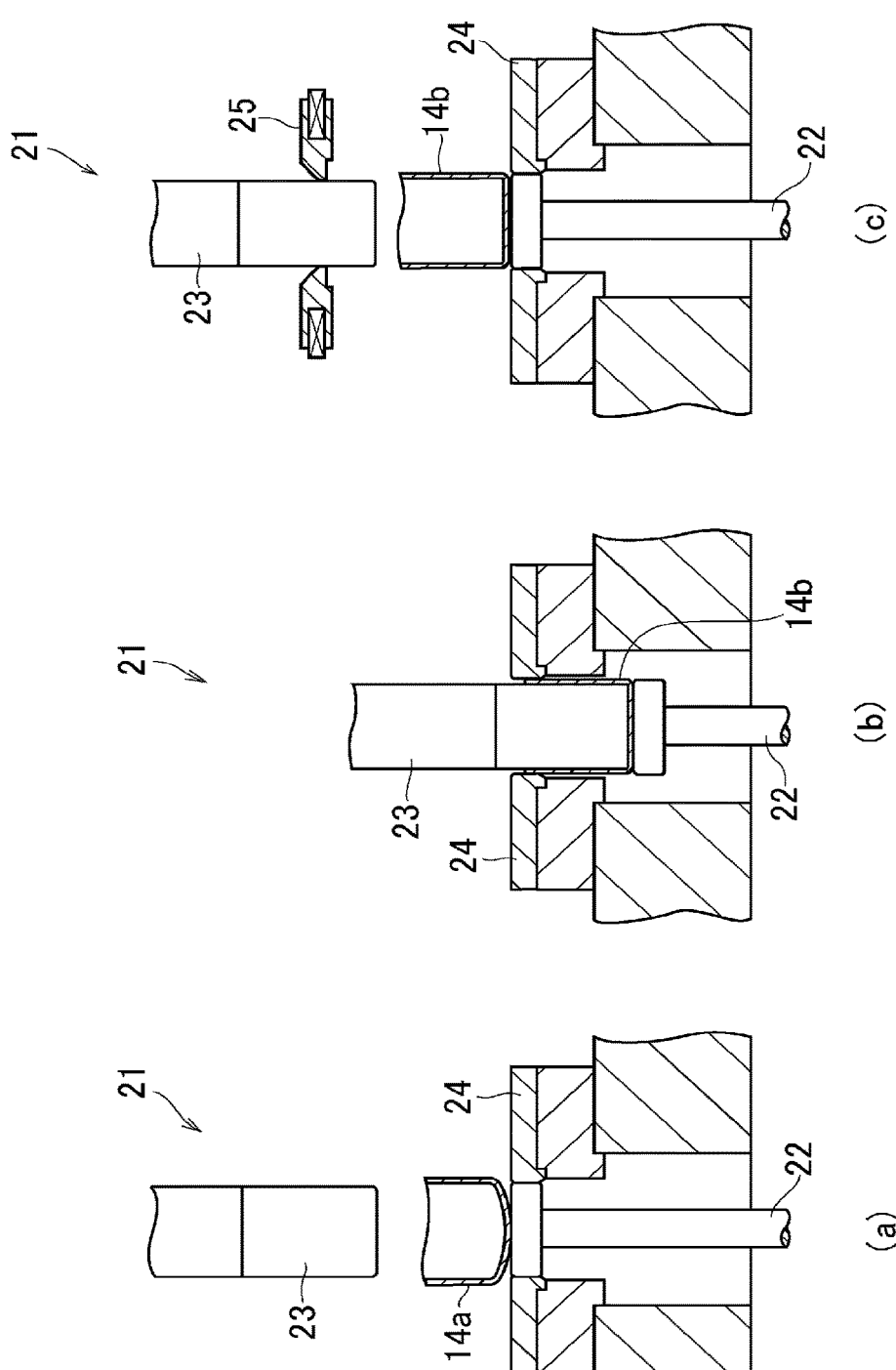
FIG. 5 is a cross-sectional view showing one example of a movement of a transfer press machine at each step.

A mechanism of the transfer press machine is not changed all through the foregoing steps, and one example of a mechanism of the transfer press machine is schematically shown in FIG. 5. In the following explanations, the intermediate product 14 before processed by the transfer press machine will be referred to as the intermediate product 14a, and the intermediate product 14 after processed by the transfer press machine will be referred to as the intermediate product 14b. The transfer press machine 21 shown in FIG. 5 comprises: a lifter 22 on which the intermediate product 14a manufactured by the press machine 6 at the previous step and conveyed thereto is placed; a punch 23 that stamps the intermediate product 14a placed on the lifter 22; and a die 24 that deforms the outer shape of the intermediate product 14a by drawing or ironing the intermediate product 14a together with the punch 23, or y drawing and ironing the intermediate product 14a simultaneously together with the punch 23.

When the intermediate product 14a is stamped by the punch 23, the lifter 22 is moved downwardly by a pushing force of the punch 23. Specifically, an inner profile of the die 24 is substantially congruent with the outer shape of the intermediate product 14b. Whereas, the punch 23 has an inner profile possible to maintain a clearance corresponding to a wall thickness of the intermediate product 14b between the punch 23 and the die 24.

The intermediate product 14a is drawn and ironed by moving the punch 23 downwardly as depicted in FIG. 5 (b). That is, the intermediate product 14a is drawn and ironed simultaneously by a drawing/ironing method. The intermediate product 14a is shaped into the intermediate product 14b by moving the punch 23 downwardly to a predetermined level, Consequently, the intermediate product 14b is fitted tightly onto the punch 23, and a bottom of the intermediate product 14b is held between an upper surface of the lifter 22 and a lower surface of the punch 23. Then, the punch 23 is moved upwardly. As illustrated in FIG. 5 (c), the transfer press machine 21 is provided with a stripper finger 25 so that the intermediate product 14b is dismounted from the punch 23 by moving the punch 23 upwardly. Here, a structure of the stripper finger 25 is similar to that of the above-mentioned stripper finger 15. Specifically, in the situation where the intermediate product 14b is fitted onto the punch 23, an upper end of the intermediate product 14b is brought into contact to the stripper finger 25 by moving the punch 23 upwardly. Consequently, the intermediate product 14b is dismounted from the punch 23 and placed on the upper surface of the lifter 22. Then, the intermediate product 14b is conveyed by a not shown catch finger to a next stage of the process. In the case that the ironing process is not applied to the intermediate product 14a in the initial phase, the clearance between the punch 23 and the die 24 is set wider than the wall thickness of the intermediate product 14a.

As described, in the intermediate product 14 having an elliptical transverse cross-section, a curvature radius of each corner 20 is reduced gradually by applying the drawing and the ironing to the intermediate product 14 multiple times. Eventually, the cross-sectional shape of the intermediate product 14 is deformed into a rectangular shape, and the intermediate product 14 is shaped into the final product by gradually reducing thicknesses of the side walls on both sides of the corner 20.

Thus, the side walls of the intermediate product 14 are ironed while reducing the curvature radius of each corner 20 gradually by drawing the intermediate product 14. During the ironing process, if ironing rates of the shorter side wall and the longer side wall are different from each other, the corner 20 would serve as a transitional section of a wall thickness. For example, if a curvature radius of the corner 20 is short, an area of the transitional section is narrow. In this case, material of the side wall being ironed at a greater rate would flow toward the side wall being ironed at a smaller rate, and consequently one of the side walls would be wrinkled or ruptured.

In order to avoid such disadvantage, in the manufacturing method of the battery case according to the present invention, the ironing process is executed in such a manner as to maintain a difference between the ironing rates of the shorter side wall and the longer side wall less than a predetermined difference, after the curvature radius of the corner 20 is reduced to a certain extent. Specifically, at the steps before the intermediate product 14 is shaped into the configuration depicted in FIG. 3 (d) or 4 (d), the curvature radius of each of the corner 20 is still equal to a predetermined radius or longer. In this situation, the longer side walls including the straight sections 18 and the shorter side walls including the straight sections 19 are ironed at ironing rates (i.e., nominal thickness reduction rates) to reduce wall thicknesses of the longer side walls and the shorter side walls to target thicknesses. That is, one of the longer side walls and the shorter side walls are ironed at a greater ironing rate, and the other one of the longer side walls and the shorter side walls are ironed at a smaller ironing rate. In other words, the ironing rates of the longer side walls and the shorter side walls are set separately to different rates.

Whereas, at the steps after the intermediate product 14 has been shaped into the configuration depicted in FIG. 3 (e) or 4 (e), the curvature radius of each of the corner 20 has been reduced shorter than a predetermined radius. In this situation, the difference between ironing rate of the longer side walls including the straight sections 18 and the ironing rate of the shorter side walls including the straight sections 19 is reduced less than a predetermined difference.

For example, after the curvature radius of each of the corner 20 has been reduced shorter than the predetermined radius, the ironing rate of one of the longer side walls and the shorter side walls is increased, and the ironing rate of the other one of the longer side walls and the shorter side walls is reduced. Consequently, the difference between ironing rates of the longer side wall and the shorter side wall erected across the corner 20 is reduced. Specifically, the target thicknesses and the ironing rates of the shorter side walls and the longer side walls are set based on: the configuration of the final product; and the ironing rates of the shorter side wall and the longer side wall to be ironed after the curvature radius of the corner 20 is reduced shorter than the predetermined radius. For instance, the target thicknesses and e ironing rates of the shorter side walls and the longer side walls are set such that a ratio between thicknesses of the shorter side walls and the longer side walls before the curvature radius of the corner 20 is reduced shorter than the predetermined radius is equalized to a ratio between thicknesses of the shorter side walls and the longer side walls of the final product.

A plastic flow of the material in the circumferential direction of the intermediate product 14 resulting from ironing the short r side walls and the longer side walls is considered to vary depending on heights of the shorter side walls and the longer side walls. Therefore, the ironing rates of the shorter side walls and the longer side walls employed in the condition where the curvature radius of the corner 20 is still equal to the predetermined radius or longer are set to values possible to prevent variation of flowage of the material between the shorter side walls and the longer side walls in the circumferential direction of the intermediate product 14 after the curvature radius of the corner 20 is reduced shorter than the predetermined radius. In other words, the ironing rates of the shorter side walls and the longer side walls employed in the condition where the curvature radius of the corner 20 is still equal to the predetermined radius or longer are set such that the shorter side walls and the longer side walls are expanded in the height direction in same amounts (or rates). Specifically, the ironing rates of the shorter side walls and the longer side walls employed in the condition where the curvature radius of the corner 20 is still equal to the predetermined radius or longer are set such that a difference between the heights of the shorter side walls and the longer side walls when the curvature radius of the corner 20 will be reduced shorter than the predetermined radius is to be reduced to a predetermined value or less.

Upper edges of the shorter side walls and the longer side walls may not be always expanded homogeneously and would be waved depending on e.g., an easiness of plastic flow of the material resulting from ironing. Therefore, the difference between the heights of the shorter side walls and the longer side walls is defined as a difference between an average height of the shorter side walls and an average height of the longer side walls. Preferably, the above-mentioned predetermined value of the difference between the heights of the shorter side walls and the longer side walls is set to 3 mm or less.

Otherwise, in order to homogenize the easiness of plastic flow of the material in the circumferential direction of the intermediate product 14 after the curvature radius of the corner 20 is reduced less than the predetermined radius, a shape of the blank 7 cut out of the coil material may also be adjusted such that the difference between the heights of the shorter side walls and the longer side walls is reduced to the predetermined value or less by the drawing process and the ironing process executed before the curvature radius of the corner 20 is reduced less than the predetermined radius.

In addition, in order to maintain the difference between the ironing rates of the longer side wall and the shorter side wall to the predetermined difference, it is preferable to set the predetermined radius of the curvature radius of the corner 20 to 2 mm or shorter. Further, after the curvature radius of the corner 20 has been reduced shorter than the predetermined radius, it is preferable to reduce the difference between the ironing rates of the shorter side walls and the longer side walls to 1% or less.

The inventors of the present invention conducted an experimentation to verify whether the side walls of the final product having a rectangular transverse cross-section were wrinkled as a result of applying the drawing and ironing to the intermediate product 14 having an elliptical transverse cross-section multiple times as illustrated in FIGS. 3 and 4, while changing the ironing rates of the shorter side walls and the longer side walls of the intermediate product 14. Conditions and results of the experimentation are shown below.

In the experimentation conducted by the inventors, a coil material of aluminum alloy of 1050 series having a thickness of 1.5 mm was used. In the first experimentation, the case body 2 was shaped to have a rectangular transverse cross-section, while adjusting a length of each of the shorter side walls to 27.5 mm, a thickness of each of the shorter side walls to 1.0 mm, a length of each of the longer side walls to 148 mm, a thickness of each of the longer side walls to 1.2 mm, and a height thereof to 100 mm. Specifically, in the first experimentation, the ironing rates at each step to form the case body 2 were set such that a difference between the ironing rates of the shorter side walls and the longer side walls is reduced less than the predetermined difference after the curvature radius of the corner 20 is reduced shorter than the predetermined radius.

A result of the first experimentation is shown in table 1. In table 1, a drawing amount shown therein is a difference between an outer size of the punch used in the drawing process at a previous step and an outer size of the punch used in the drawing process at a subsequent step. Specifically, in table 1, the drawing amount is indicated as a difference between dimension from centers of the punches.

TABLE 1

| | SHORTER SIDE WALL | | | | | LONGER SIDE WALL | | | | | DIFFERENCE IN IRONING RATE BETWEEN LONGER SIDE WALL AND SHOTER SIDE WALL |
| | DIE | PUNCH | TARGET WALL THICKNESS | IRONING RATE | DRAWING AMOUNT | DIE | PUNCH | TARGET WALL THICKNESS | IRONING RATE | DRAWING AMOUNT | |
| --- | --- | --- | --- | --- | --- | --- | --- | --- | --- | --- | --- |
| CUP | 185.00 | 182.00 | 1.500 | 0.0% | 18.00 | 55.00 | 52.00 | 1.500 | 0.0% | 31.50 | 0.0% |
| 1ST | 177.20 | 174.20 | 1.500 | 0.0% | 3.90 | 45.00 | 42.00 | 1.500 | 0.0% | 5.00 | 0.0% |
| 2ND | 169.58 | 166.80 | 1.390 | 7.3% | 3.70 | 39.60 | 36.60 | 1.500 | 0.0% | 2.70 | -7.3% |
| 3RD | 161.97 | 159.40 | 1.285 | 7.6% | 3.70 | 35.00 | 32.00 | 1.500 | 0.0% | 2.30 | -7.6% |
| 4TH | 154.37 | 152.00 | 1.185 | 7.8% | 3.70 | 30.65 | 27.80 | 1.425 | 5.0% | 2.10 | -2.8% |
| 5TH | 148.38 | 146.20 | 1.090 | 8.0% | 2.90 | 27.82 | 25.20 | 1.310 | 8.1% | 1.30 | 0.1% |
| 6TH | 148.00 | 146.00 | 1.000 | 8.3% | 0.10 | 27.50 | 25.10 | 1.200 | 8.4% | 0.05 | 0.1% |

As can be seen from Table. 1, at the first step, none of the shorter side walls and the longer side walls were ironed. At the second and third steps, only the shorter side walls were ironed, and at the fourth to sixth steps, both of the shorter side walls and the longer side walls were ironed.

In the first experimentation, the difference between the ironing rates of the shorter side walls and the longer side walls was set relatively large at the second and third steps. Whereas, at the fourth to sixth steps after the curvature radius of the corner 20 had been reduced, the difference between ironing rates of the shorter side walls and the longer side walls 1 as set relatively small. That is, the ironing rate of the shorter sider walls was increased at the initial steps so as to achieve a desired wall thickness of the final product by ironing the shorter side walls and the longer side walls at substantially same rates after the curvature radius of the corner 20 is reduced.

In the first experimentation, the final product having a uniform height could be shaped without wrinkling and rupturing the shorter side walls and the longer side walls.

In the second experimentation, the case body 2 was shaped in such a manner as to adjust a thickness of each of the longer side walls to 0.7 mm. The remaining conditions of the second experimentation were identical to those of the first experimentation.

A result of the second experimentation is shown in table 2.

TABLE 2

| | SHORTER SIDE WALL | | | | LONGER SIDE WALL | | | | | DIFFERENCE IN IRONING RATE BETWEEN LONGER SIDE WALL AND SHOTER SIDE WALL |
| --- | --- | --- | --- | --- | --- | --- | --- | --- | --- | --- |
| | DIE | PUNCH | TARGET WALL THICKNESS | IRONING RATE | DRAWING AMOUNT | DIE | PUNCH | TARGET WALL THICKNESS | IRONING RATE | DRAWING AMOUNT | |
| CUP | 185.20 | 182.00 | 1.600 | 0.0% | 18.00 | 55.00 | 52.00 | 1.500 | 0.0% | 31.50 | 0.0% |
| 1ST | 177.40 | 174.20 | 1.600 | 0.0% | 3.90 | 44.46 | 42.00 | 1.230 | 18.0% | 5.00 | 18.0% |
| 2ND | 170.00 | 166.80 | 1.600 | 0.0% | 3.70 | 38.80 | 36.60 | 1.100 | 10.6% | 2.70 | 10.6% |
| 3RD | 162.40 | 159.40 | 1.500 | 6.3% | 3.70 | 34.07 | 32.00 | 1.035 | 5.9% | 2.30 | −0.3% |
| 4TH | 154.74 | 152.00 | 1.370 | 8.7% | 3.70 | 29.70 | 27.80 | 0.950 | 8.2% | 2.10 | −0.5% |
| 5TH | 148.54 | 146.20 | 1.170 | 14.6% | 2.90 | 26.83 | 25.20 | 0.815 | 14.2% | 1.30 | −0.4% |
| 6TH | 148.00 | 146.00 | 1.000 | 14.5% | 0.10 | 26.50 | 25.10 | 0.700 | 14.1% | 0.05 | −0.4% |

As described, the second experimentation was conducted in the substantially same conditions except for forming the longer side walls thinner than the shorter side walls. Specifically, in order to iron the shorter side walls and the longer side walls at the same rate after the curvature radius of the corner 20 is reduced, only the longer side walls were ironed at the first and second steps, and both of the shorter side walls and the longer side walls were ironed at substantially same rates after the third step.

In the second experimentation, the final product having a uniform height also could be shaped without wrinkling and rapturing the shorter side walls and the longer side walls.

In the third experimentation, the final product as the second experimentation was shaped by ironing the shorter side walls and the longer side walls while maintaining a difference between ironing rates of the shorter side walls and the longer side walls substantially constant from the first step to the sixth step. To this end, in the third experimentation, the longer side walls ware ironed at greater rates than the shorter side walls from the first sixth steps.

A result of the second experimentation is shown in table 3.

TABLE 3

| | SHORTER SIDE WALL | | | | | LONGER SIDE WALL | | | | | DIFFERENCE IN IRONING RATE BETWEEN LONGER SIDE WALL AND SHOTER SIDE WALL |
| --- | --- | --- | --- | --- | --- | --- | --- | --- | --- | --- | --- |
| | DIE | PUNCH | TARGET WALL THICKNESS | IRONING RATE | DRAWING AMOUNT | DIE | PUNCH | TARGET WALL THICKNESS | IRONING RATE | DRAWING AMOUNT | |
| CUP | 185.20 | 182.00 | 1.600 | 0.0% | 18.00 | 55.00 | 52.00 | 1.500 | 0.0% | 31.50 | 0.0% |
| 1ST | 177.30 | 174.20 | 1.550 | 3.1% | 3.90 | 44.76 | 42.00 | 1.380 | 8.0% | 5.00 | 4.9% |
| 2ND | 169.82 | 166.80 | 1.510 | 2.6% | 3.70 | 39.14 | 36.60 | 1.270 | 8.0% | 2.70 | 5.4% |

TABLE 3-continued

| | SHORTER SIDE WALL | | | | | LONGER SIDE WALL | | | | | DIFFERENCE IN IRONING RATE BETWEEN LONGER SIDE WALL AND SHOTER SIDE WALL |
|---|---|---|---|---|---|---|---|---|---|---|---|
| | DIE | PUNCH | TARGET WALL THICKNESS | IRONING RATE | DRAWING AMOUNT | DIE | PUNCH | TARGET WALL THICKNESS | IRONING RATE | DRAWING AMOUNT | |
| 3RD | 162.32 | 159.40 | 1.460 | 3.3% | 3.70 | 34.32 | 32.00 | 1.160 | 8.7% | 2.30 | 5.4% |
| 4TH | 154.68 | 152.00 | 1.340 | 8.2% | 3.70 | 29.82 | 27.80 | 1.010 | 12.9% | 2.10 | 4.7% |
| 5TH | 148.53 | 146.20 | 1.165 | 13.1% | 2.90 | 26.89 | 25.20 | 0.845 | 16.3% | 1.30 | 3.3% |
| 6TH | 148.00 | 146.00 | 1.000 | 14.2% | 0.10 | 26.50 | 25.10 | 0.700 | 17.2% | 0.05 | 3.0% |

In the third experimentation, the shorter side walls and the longer side walls could be ironed without being wrinkled and raptured from the first fourth steps. However, the shorter side walls were wrinkled at the fifth and sixth steps.

In the fourth experimentation, the final product as the second experimentation was also shaped by ironing the shorter side walls and the longer side walls. In the fourth experimentation, specifically, the shorter side walls ware ironed at greater rates than the longer side walls at the fifth and sixth steps.

A result of the second experimentation is shown in table 4.

TABLE 4

| | SHORTER SIDE WALL | | | | | LONGER SIDE WALL | | | | | DIFFERENCE IN IRONING RATE BETWEEN LONGER SIDE WALL AND SHOTER SIDE WALL |
|---|---|---|---|---|---|---|---|---|---|---|---|
| | DIE | PUNCH | TARGET WALL THICKNESS | IRONING RATE | DRAWING AMOUNT | DIE | PUNCH | TARGET WALL THICKNESS | IRONING RATE | DRAWING AMOUNT | |
| CUP | 185.20 | 182.00 | 1.600 | 0.0% | 18.00 | 55.00 | 52.00 | 1.500 | 0.0% | 31.50 | 0.0% |
| 1ST | 177.40 | 174.20 | 1.600 | 0.0% | 3.90 | 44.66 | 42.00 | 1.330 | 11.3% | 5.00 | 11.3% |
| 2ND | 170.00 | 166.80 | 1.600 | 0.0% | 3.70 | 38.96 | 36.60 | 1.180 | 11.3% | 2.70 | 11.3% |
| 3RD | 162.48 | 159.40 | 1.540 | 3.8% | 3.70 | 34.07 | 32.00 | 1.035 | 12.3% | 2.30 | 8.5% |
| 4TH | 154.78 | 152.00 | 1.390 | 9.7% | 3.70 | 29.62 | 27.80 | 0.910 | 12.1% | 2.10 | 2.3% |
| 5TH | 148.56 | 146.20 | 1.180 | 15.1% | 2.90 | 26.80 | 25.20 | 0.800 | 12.1% | 1.30 | −3.0% |
| 6TH | 148.00 | 146.00 | 1.000 | 15.3% | 0.10 | 26.50 | 25.10 | 0.700 | 12.5% | 0.05 | −2.8% |

In the fourth experimentation, the shorter side walls and the longer side walls could be ironed without being wrinkled and raptured from the first to fourth steps. However, the longer side walls were wrinkled at the fifth and sixth steps.

Thus, in all of the first to fourth experimentations, both of the shorter side walls and the longer side walls were not wrinkled and ruptured from the first to fourth steps even though the shorter side walls and the longer side walls were ironed at different rates. However, if the shorter side walls and the longer side walls were ironed at different rates at the fifth and sixth steps, one of the shorter side walls and the longer side walls ironed at the smaller rate were wrinkled. This is because the plastic flow of the material resulting from the reduction in the thickness of the wall ironed at the greater rate was absorbed by the corner 20 in the condition where the curvature radius of the corner 20 is long. That is, the corner 20 served as a transitional section of a wall thickness. By contrast, given that the curvature radius of the corner 20 is short, the corner 20 may not serve sufficiently as a transitional section of a wall thickness. In this case, a surface of the wall ironed at the smaller rate would be wrinkled by the plastic flow of the material from the wall ironed at the greater rate.

Therefore, the inventors of the present invention conducted an experimentation to verify a relation between: a curvature radius of the corner 20; and a difference between ironing rates of the shorter side walls and the longer side walls. Specifically, the experimentation was conducted using an intermediate product 14 in which a curvature radius of each corner 20 was 1 mm, an intermediate product 14 in which a curvature radius of each corner 20 was 2 mm, and an intermediate product 14 in which a curvature radius of each corner 20 was 3 mm. In the experimentation, the shorter side walls and the longer side walls of each of the intermediate product 14 were ironed while changing a difference between ironing rates of the shorter side walls and the longer side walls from 1% to 3%, so as to verify whether any of the shorter side walls and the longer side walls were wrinkled. A result of the experimentation is shown in table 5. In table 5, "○" indicates that the side wall was not wrinkled, and "Δ" indicates that the side wall was wrinkled, and "X" indicates that the side wall was ruptured.

15

TABLE 5

| CURVATURE RADIUS OF | DIFFERENCE IN IRONING RATE BETWEEN SHORTER SIDE WALL AND LONGER SIDE WALL | | |
|---|---|---|---|
| CORNER | 1% | 2% | 3% |
| R1 | ○ | Δ | X |
| R2 | ○ | Δ | Δ |
| R3 | ○ | ○ | Δ |

As can be seen from the result of the experimentation, the shorter side walls and the longer side walls are allowed to be ironed at different rates without being wrinkled or ruptured by increasing the curvature radius of the corner 20.

Thus, the intermediate product having an elliptical transverse cross-section is drawn into the final product having a rectangular transverse cross-section. During the process of deforming the intermediate product, the side walls are ironed to reduce a wall thickness. In this situation, after the curvature radius of the corner between the longer side wall and the shorter side wall has been reduced shorter than the predetermined radius, the difference between the ironing rates of the longer side wall and the shorter side wall is reduced to the predetermined difference or less. Consequently, the side walls of the intermediate product and the final product may be ironed without being wrinkled and ruptured.

In the situation where the curvature radius of the corner between the shorter side wall and the longer side wall is equal to the predetermined radius or longer, the corner may serve sufficiently as the transitional section of a wall thickness. In this situation, the longer side walls and the shorter side are ironed at predetermined rates to reduce wall thicknesses of the longer side walls and the shorter side walls to target thicknesses. That is, in the situation where the curvature radius of the corner between the shorter side wall and the longer side wall is equal to the predetermined radius or longer, the target thicknesses and ironing rates of the shorter side wall and the longer side wall, or a difference between thicknesses of the shorter side wall and the longer side wall can be adjusted in advance. Therefore, the final product may be shaped while achieving required thicknesses and height of the side walls by ironing the shorter side walls and the longer side walls at substantially same rates after the curvature radius of the corner 20 has been reduced, even if the required thicknesses and height of the shorter side walls and the longer side walls are different.

In addition, in the situation where the curvature radius of the corner between the shorter side wall and the longer side wall is still equal to the predetermined radius or longer, the shorter side wall and the longer side wall are ironed such that a difference between the height of the shorter side wall and the longer side wall is reduced to the predetermined value or less. Therefore, an easiness of plastic flow of the material in the height direction of the intermediate product can be homogenized when ironing the side walls after the curvature radius of the corner has been reduced shorter than the predetermined value. Otherwise, a shape of the blank cut out of the coil material may also be adjusted such that the difference between the heights of the shorter side walls and the longer side walls is reduced to the predetermined value or less. For this reason, an easiness of plastic flow of the material in the circumferential direction of the intermediate product will not be changed by a difference in easiness of plastic flow of the material in the height direction of the intermediate product between the shorter side wall and the longer side wall. Consequently, the side walls can be prevented from being wrinkled by the ironing process.

The invention claimed is:

1. A manufacturing method of a battery case having an open box-shaped case body and a sealing plate closing an opening of the case body, comprising:
    forming a bottomed intermediate product having an elliptical or oval transverse cross-section by drawing and ironing a blank prepared in advance; and
    shaping the intermediate product into the case body as a final product having a rectangular transverse cross-section enclosed by four side walls by drawing and ironing the intermediate product multiple times to reduce a curvature radius of each corner and thicknesses of the side walls formed on both sides of the corner, a first two of the four side walls being longer side walls and a second two of the four side walls being shorter side walls, and both sides of each corner including one of the longer side walls and one of the shorter side walls,
    wherein the side walls formed on both sides of the corner are ironed at predetermined rates set individually to reduce thicknesses of the shorter side wall formed on the one side of the corner and the longer side wall formed on the other side of the corner to target thicknesses, in a situation where the curvature radius of the corner between the side walls is equal to 3 mm or longer during the process of shaping the intermediate product into the final product, the predetermined rate for the longer side wall being different than the predetermined rate for the shorter side wall, and
    wherein when the curvature radius of the corner between the side walls has been reduced to 3 mm or shorter during the process of shaping the intermediate product into the final product, a difference between the predetermined ironing rate of the shorter side wall formed on one side of the corner and the predetermined ironing rate of the longer side wall formed on the other side of the corner is reduced to 1% or less.

2. The manufacturing method of the battery case as claimed in claim 1, wherein the shorter side wall formed on the one side of the corner and the longer side wall formed on the other side of the corner are ironed such that a difference between heights of the side walls is reduced to a predetermined value or less, in a situation where the curvature radius of the corner between the side walls is 3 mm or longer.

3. The manufacturing method of the battery case as claimed in claim 2, wherein the predetermined value is set such that the shorter side wall formed on the one side of the corner and the longer side wall formed on the other side of the corner are expanded in same amounts or rates when being ironed after the curvature radius of the corner between the side walls is reduced to 3 mm or shorter.

* * * * *